United States Patent
Romano

(10) Patent No.: US 7,392,145 B1
(45) Date of Patent: Jun. 24, 2008

(54) SPEEDOMETER DRIVE APPARATUS AND METHOD

(76) Inventor: James P. Romano, 2112 E. Colvin St., Syracuse, NY (US) 13210

( * ) Notice: Subject to any disclaimer, the term of this patent is extended or adjusted under 35 U.S.C. 154(b) by 0 days.

(21) Appl. No.: 11/787,391

(22) Filed: Apr. 16, 2007

(51) Int. Cl.
*G01P 21/02* (2006.01)

(52) U.S. Cl. .......................... 702/96; 702/148; 73/1.37

(58) Field of Classification Search ................ 702/96, 702/148
See application file for complete search history.

(56) References Cited

U.S. PATENT DOCUMENTS

| | | | |
|---|---|---|---|
| 1,335,833 A | | 4/1920 | Hjorth |
| 3,581,206 A | | 5/1971 | Strohm |
| 4,070,916 A | | 1/1978 | Bogosh |
| 4,083,052 A | * | 4/1978 | Metcalf .................. 346/18 |
| 4,140,970 A | | 2/1979 | Graziano |
| 4,162,445 A | | 7/1979 | Campbell |
| 4,167,699 A | * | 9/1979 | Baker .................. 324/171 |
| 4,185,489 A | | 1/1980 | Sullivan, Jr. |
| 5,001,930 A | | 3/1991 | Glover et al. |
| 5,544,076 A | * | 8/1996 | Wiggerman et al. ......... 702/142 |
| 2003/0033849 A1 | * | 2/2003 | LaBuy et al. ............... 73/1.37 |

OTHER PUBLICATIONS http://www.atrol.com/cablex.htm.
http://www.gaugeguys.com/cablex.htm.
http://www.strollometer.com/welcometostrollo.html.

* cited by examiner

*Primary Examiner*—John E Barlow, Jr.
*Assistant Examiner*—Jonathan Moffat
(74) *Attorney, Agent, or Firm*—Anthony L. Meola, Esq.

(57) ABSTRACT

An automotive speedometer drive apparatus is disclosed that replaces an existing speedometer cable of the type used to drive mechanical speedometer instruments. The drive being an electronically controlled motor made to rotate at the correct rate to give an accurate speed indication, taking into consideration the specific tire size and specific speedometer involved. The drive may also be easily installed and field-calibrated by the user without the need of any special knowledge or equipment.

12 Claims, 12 Drawing Sheets

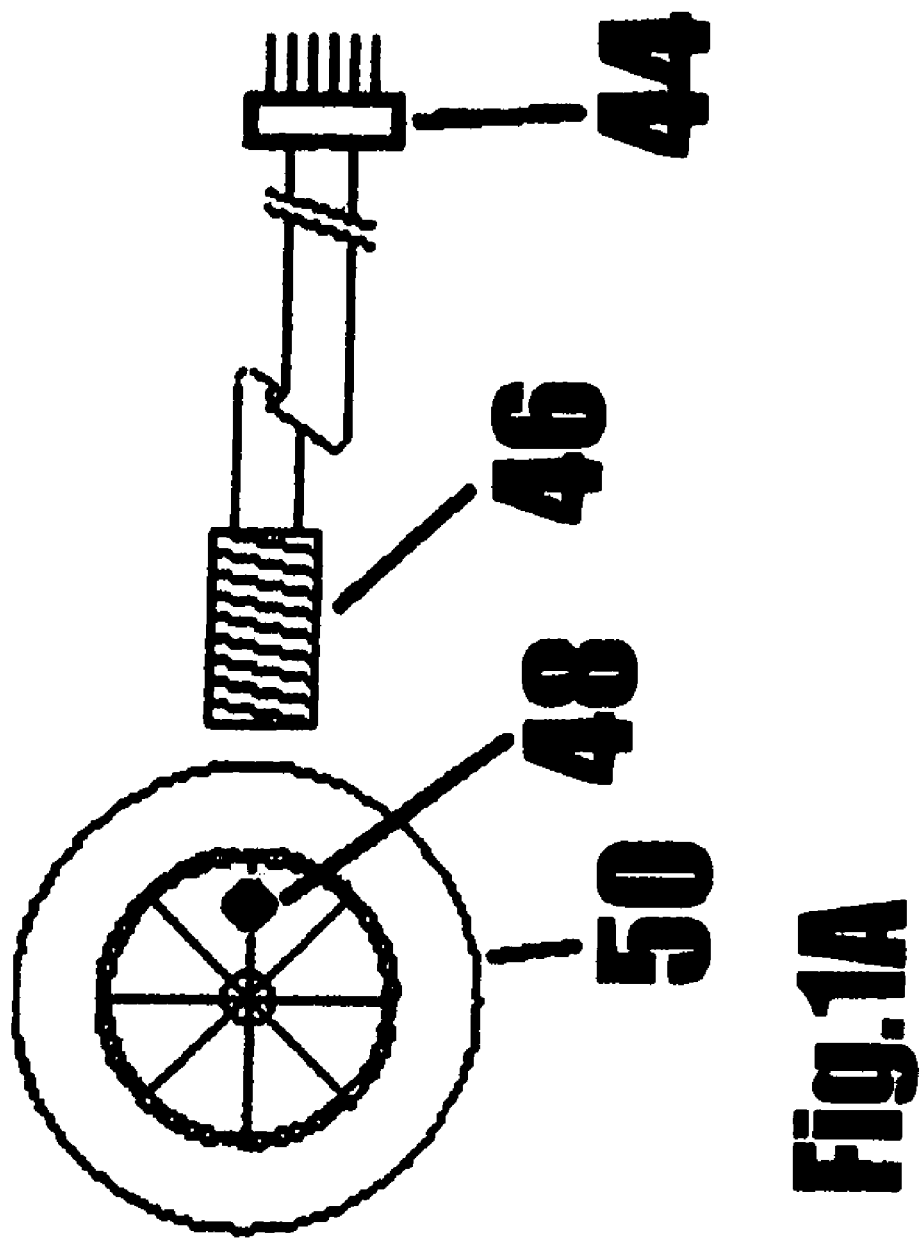

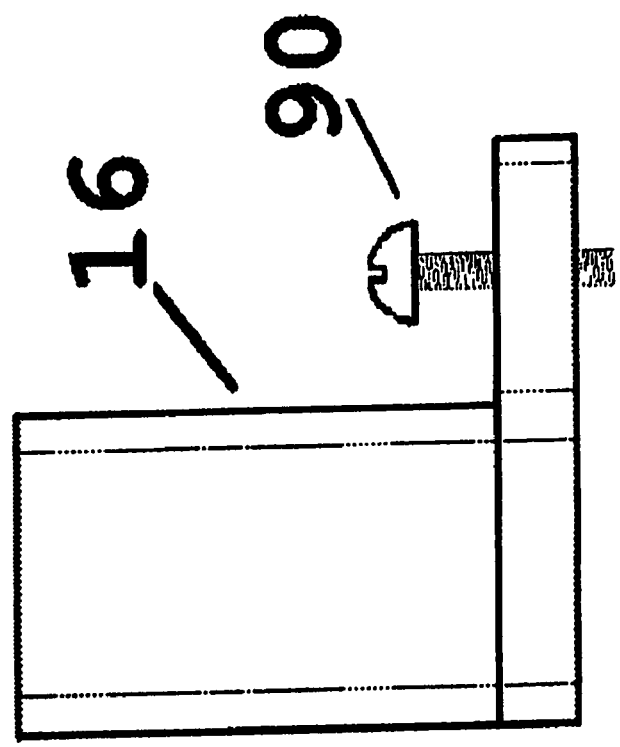

SPEEDOMETER DRIVE APPARATUS AND METHOD

BACKGROUND OF THE INVENTION

1. The Field of the Present Invention

The present invention relates generally to the field of automotive instrumentation, and more specifically to an apparatus and method for accurately driving any mechanical cable-driven speedometer instrument, as is typically found on older vehicles.

2. General Background

For the purposes of this application, the terms "processor", "microprocessor", "controller", "microcontroller" or equivalent terminology are meant to be synonymous unless otherwise stated. Likewise, the terms "automobile", "truck", "vehicle", or equivalent terminology are meant to be interchangeable unless otherwise stated. References made in the English measurement system are hereafter assumed to include their metric equivalent values and vice versa.

One of the principal instruments in all motor vehicles is the speedometer. It is universally recognized that knowing how fast one is driving is an important aspect of operating the vehicle. To that end, the mechanical speedometer, a wonderfully clever instrument, was invented. Patent office records indicate the first speedometer patent, patent number 1,335,833, was issued in 1920.

It should be noted that speedometer instruments typically display two different measurements: road speed displayed on the speedometer proper and total distance driven displayed on the odometer. Though housed in the same housing, the odometer and the speedometer are actually two separate and distinct measuring devices. The odometer measures distance traveled, and the speedometer measures the rate of speed at which the distance is currently being traversed. To avoid confusion, when speaking of the speedometer instrument as a whole, including both the speed-measuring "speedometer" and the distance measuring "odometer", the phrase "speedometer instrument" will be used. Either measuring device, taken independently of one another, will be referenced by "speedometer" or "odometer" as appropriate, unless prefaced by a descriptive phrase such as "mechanical speedometer" or "electronic speedometer", in which case the entire speedometer instrument is meant, not just its speed-measuring portion.

In a properly functioning speedometer instrument, the speedometer and odometer are calibrated such that the two measuring devices concur and cohere with one another and with the actual road speed of, and distance traversed by the vehicle. An example will help to clarify: if the vehicle is in fact driven at a constant 60 mph for one hour, the properly calibrated speedometer should read a constant 60 mph during that one hour of travel time, and at the end of the hour the odometer should show that the total mileage driven has indeed incremented by 60 miles; likewise, if the odometer registers an increment of 1 mile, and if that mile happened over the course of one minute, and if the vehicle in question has been driven at a constant speed for one minute, then the speed should have displayed as a constant 60 mph for the duration of the minute. As 60 mph is equivalent to one mile per minute the vehicle will therefore have actually traveled exactly one mile during the one minute.

In addition to being physically located in the same housing, the speedometer and the odometer typically also operate off of the same input. "Input" for speedometer instruments reduces in the end to information about the rotation rate of the road wheel, whether detected directly, or as is more usually the case, detected indirectly by means of a physical or other (e.g. electronic) connection to some part of the drive train that rotates at a rate proportional to the rotation rate of the road wheel.

For the mechanical speedometers, the "input device", that is, the means by which the speedometer instrument receives information about the rotation rate of the road wheels, is the speedometer cable, which is a mechanically rotating sheathed cable. The speedometer cable physically attaches to and rotates an input shaft on the back of the speedometer instrument. The other end of the speedometer cable physically attaches to and is rotated by a set of gears called the "drive gear set" or "gear set", which is usually (but not necessarily) physically located in the vehicle transmission. The drive gear set is operatively (but not usually directly physically) connected to the road wheels, so that the gears in the drive gear set rotate at a rotation rate proportionate to the rotation rate of the road wheels. The relative size of the gears in the gear set (otherwise referred to as the "speedometer drive gear ratio") determines the rotation rate of the speedometer cable relative to the rotation rate of the road wheels.

With mechanical speedometers, typically, the odometer portion of the instrument is mechanically connected to the instruments rotating input shaft. This is generally accomplished by the use of small gears inside the speedometer instrument. These gears are driven by the input shaft, which in turn is driven by the speedometer cable. Whereas the "odometer" is mechanically coupled, the "speedometer" portion of the instrument, is typically magnetically coupled to the same rotating input shaft. The effective amount of coupling is determined by a spring that counter-balances the driven magnet inside the instrument.

By design, all mechanical speedometers require a specific number of revolutions of the input shaft (via the speedometer cable) to register an increment of one mile on the speedometer instrument's odometer (assuming the instrument in question was designed to display British Imperial or U.S. measurement units). This odometer-specific number of revolutions of the input shaft (via the speedometer cable) is known as the "odometer constant", which for the mechanical speedometer is expressed in "revolutions per unit distance", specifically, for instruments using British Imperial or U.S. measurement units, "revolutions per mile".

The "speedometer proper," that is, the speed-measuring device inside the speedometer instrument, is calibrated such that the speed displayed on the speedometer instrument concurs and coheres with incremental changes in the odometer reading. Specifically, it is calibrated such that when the speedometer reads 60 mph, the speedometer cable is driving the speedometer instrument input shaft at a rotation rate per minute numerically equal to the odometer constant. This calibration factor is expressed as the "speedometer constant", which, to turn the definition around, is the number of revolutions per minute of the input shaft (and hence the speedometer cable) at which the speedometer indicates a speed of 60 mph.

Although the odometer constant is measured in revolutions per mile (distance) and the speedometer constant is measured in revolutions per minute (time), the odometer and speedometer constants will be numerically equal in any given speedometer instrument if the instrument is working properly. It is known and understood that it takes a specific number of revolutions of any given speedometer instrument input to cause the odometer to register a one-mile change in distance. Since this is a "distance only" measurement, the time it takes to accomplish it is immaterial. It is also known that the speedometer portion of the instrument that measures miles/hour (distance per unit time) is time dependent. Since both are simultaneously measuring the rotation of the same input shaft, we can see that the action of the two parts of the instrument must correlate if it is deemed "calibrated". For example, the same number of input revolutions that causes the odometer to register a one-mile change must happen in exactly one minute in order to cause the speedometer to register 60 mph (1 mile/minute). More or less time will result in a higher or lower indication on the speedometer. Modifications of this brief explanation of speedometer and odometer constants for instruments manufactured using metric or other measurement units are straightforward matters of unit conversions.

As the speedometer and odometer constants are numerically equal, the term "speedometer constant" will be used unless a clear distinction needs to be made between "revolutions per minute" and "revolutions per mile". Tire circumference and the speedometer constant are the two main factors involved when designing a vehicle speed measuring system. The interposing "speedometer cable drive gear set" ratio is chosen such that every rotation of the fitted tire will cause the input to the speedometer to turn the appropriate amount. Thus, neither the tire circumference nor the speedometer constant determines what the other must be. However, the example below is accurate if one assumes a 1:1 "speedometer cable drive gear set" ratio.

An example of the relationship between tire circumference, speedometer constant and speedometer drive gear ratio follows: If the speedometer constant is 1026 rev/mile, the tire must travel one mile every 1026 turns of the speedometer cable, which means that the tire circumference must be 1/1026 mile or .00975 mile, or as more usually measured, 61.75 inches, and hence the tire diameter must be 61.75/"pi" or 19.7 inches. As there are 63,360 inches in one mile, a 61.75-inch circumference tire will rotate 63,360/61.75 or 1026 rotations in one mile. Hence the 1:1 drive gear ratio. Changes to either tire size or speedometer constant are generally compensated for by changes in the speedometer drive gear ratio. In the 1970s a new variation on the speedometer instrument appeared, typically referred to as an "electronic speedometer", whose pointer was made to move in response to a train of electronic pulses generated by a pulse generator, which pulse generator is usually located inside the transmission of the vehicle. The "electronic speedometer", of which there are many varieties and which is in use on many current production vehicles, has no need for the mechanical speedometer's rotating cable. The speedometer and odometer constants remain applicable for the electronic speedometer, but the relevant units are impulses per minute and per mile, rather than revolutions per minute and per mile. Another recent innovation in speedometer technology is the digital speedometer. Digital speedometers are electronic speedometers that display speed using an LED (Light Emitting Diode) or LCD (Liquid Crystal Display) instead of a mechanically driven pointer. None of these technologies employ the mechanical speedometer's rotating cable.

Despite the newer variations on speedometer instrumentation, many vehicles on the road today, and even some of the more recent production vehicles, still use the mechanical speedometer with its rotating cable drive. Something as simple as a change in tire size when replacing worn tires will render inaccurate the speed and odometer readings of not just the mechanical speedometer, but also the other types of speedometer outlined above. There exist various ways of addressing this problem for each type of speedometer instrumentation.

Throughout the world many individuals derive great pleasure from restoring, rebuilding, or otherwise customizing motor vehicles. A universal problem facing owners of vehicles with mechanical speedometers is keeping the speedometer instrument readings accurate in the face of vehicle repairs, upkeep, or custom modifications involving the various components of the drive train. Although there are methods to regain the accuracy of the speedometer instrument in any given situation, the means to do so is labor-intensive, time-consuming and generally expensive, involving the services of specialists who maintain facilities and equipment specifically designed for this purpose. Even if these expensive and time-consuming methods are employed, further modifications to the vehicle's drive train components may and likely will again render the speedometer inaccurate; and will require yet another investment of time and money to, yet again, correct the problem. Many people choose to live with speedometers that are mildly to grossly inaccurate simply because of the difficulty and expense in keeping them accurate. The present invention addresses this problem.

Although accurate aftermarket speedometer instruments are available as replacement units, very often vehicle owners find it aesthetically or otherwise desirable to keep the original mechanical instrumentation with their vehicle. The present invention has been created in light of the need to circumvent this problem and other problems highlighted herein.

SUMMARY OF THE INVENTION

The present invention includes a method and apparatus for accurately driving any mechanical, cable-driven analog speedometer instrument, accounting for any change in drive train components that would otherwise render the speedometer instrument readings inaccurate, such as changes in gearing or tire size. An advantage of the present invention includes embodiments that can be easily installed even by the layman; and once such a unit is installed, it can be quickly and easily recalibrated as needed upon subsequent repair or modification involving changes to the vehicle's drive train components, at no further cost, without the need to move the vehicle, and without the need of any special knowledge or equipment.

In a first aspect the present invention includes a speed determining apparatus for a vehicle having a set of road wheels and a mechanical speedometer, where the apparatus includes a motor mounted to the mechanical speedometer, a shaft encoder operatively fitted to the motor to facilitate the measurement of rotation by the motor, a sensor capable of sensing rotation of one of the road wheels and an electronic control circuit electronically connected to the shaft encoder and the sensor. The electronic control circuit is monitors the sensor and determines road wheel speed. The electronic control circuit also monitors the shaft encoder and controls the speed of the motor in response to the determined wheel speed. The electronic control circuit is structured and arranged to display visual indicia based upon a location of a mechanical pointer on the face of the speedometer instrument combined with the measured rotation of the motor by the shaft encoder.

In some embodiments the motor is mounted to the speedometer via a self aligning mechanical mount. In some embodiments the speed determining apparatus includes at least one memory device with a first software program stored on the memory device, where the first software program includes instructions to perform a measured mile routine. The memory device may also include a second software program stored on the memory device, where the second software program includes instructions to perform a road wheel calibration routine. The memory device may also include a third software program stored on the memory device, where the third software program includes instructions to perform a motor coder routine. The memory device may also include a fourth software program stored on the memory device, where the fourth software program includes instructions to perform a speedometer calibration routine.

In a second aspect the present invention includes a method for calibrating a speedometer instrument having a shaft encoder, where the method includes determining a calibration constant of the speedometer instrument by initiating a set program for the speedometer instrument, determining an elapsed time of about 1 complete shaft encoder pulse and storing the elapsed time in a digital storage medium and iteratively comparing the elapsed time to values on a calibration table until a matched speed is found. The method also includes determining the location of a pointer on the speedometer, comparing the location of the point relative to the matched speed in the digital recording medium and comparing the location of the pointer with that of the matched speed.

In some embodiments the method includes determining the elapsed time of 1 complete shaft encoder pulse by receiving a first positive encoder signal, receiving a second positive encoder pulse edge signal and determining an elapsed time of about $1/32$ revolutions based upon the first and second positive encoder signals.

In some embodiments the location of the pointer a physical location on a mechanical speedometer. In some embodiments the location of the pointer is represented by an electric signal from an electronic speedometer.

Each of the above-referenced aspects of the present invention, as well as the various embodiments are explained in further detail below in connection with the Detailed Description of the Preferred Embodiments and the Claims sections.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIGS. 1A and 1B are block diagrams of the various component parts according to one embodiment of the present invention;

FIGS. 3A-3C show various views of a motor mount according to one embodiment of the present invention;

DETAILED DESCRIPTION OF THE PREFERRED EMBODIMENTS

Figure 1B:
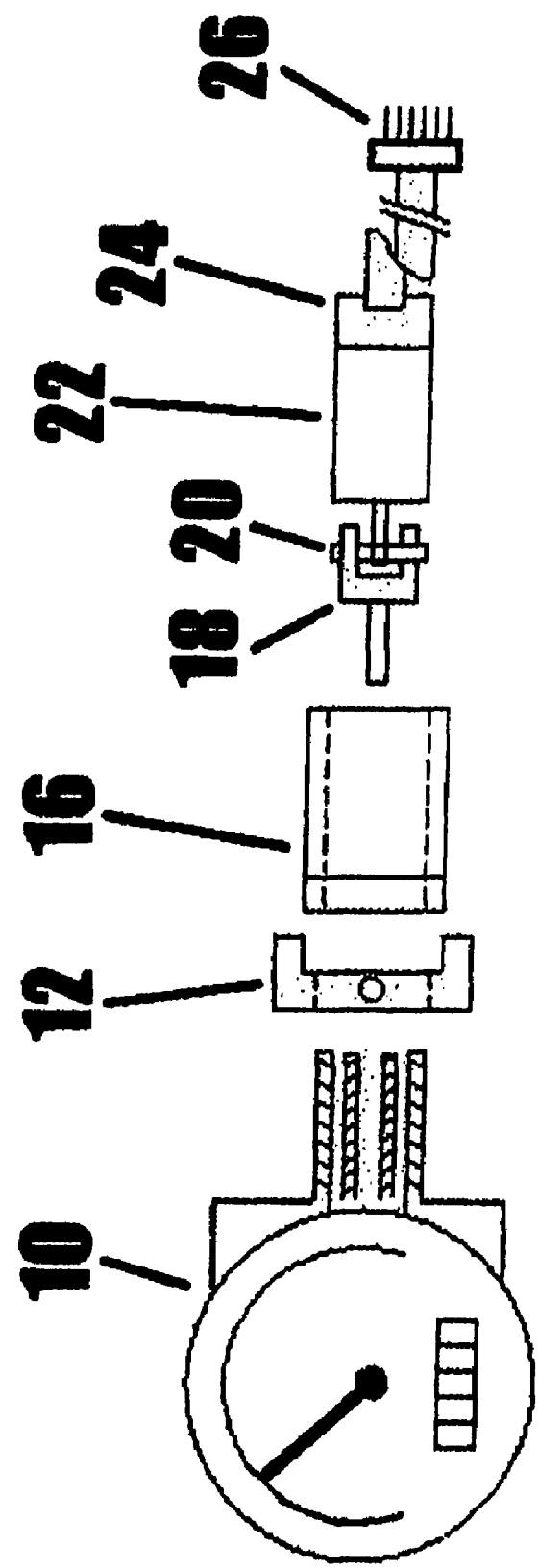

The present disclosure will now be described more fully with reference to the Figures in which an embodiment of the present disclosure is shown. The subject matter of this disclosure may, however, be embodied in many different forms and should not be construed as being limited to the embodiments set forth herein.

In the subsequent discussion of the invention, "look-up tables" will be mentioned. There are three such tables. One is a reference table that contains the "one rotation pulse width" in microseconds, of a reference size tire for each of 255 speeds from 1 mph to 255 mph. This table is included as part of the control program and is referred to as the "reference table". The remaining tables are generated during the "calibration" of the device. The first such table gives the computer program sufficient information about the specific speedometer being used. This is referred to as the "speedometer look-up table". The second table is specific to the tire size being employed and is referred to as the "wheel table". For any speedometer instrument, the introduction of a tire whose circumference is larger or smaller than that for which the speedometer instrument was designed "fools" the instrument into thinking the vehicle is going at one speed when indeed it is actually going at another. This, of course, is because a larger diameter tire travels a greater physical distance in one revolution than a smaller diameter tire, and .vice versa. Because the speedometer constant for a given instrument is fixed, changing the speedometer drive gear set to a different ratio is the accepted method of compensating for such drive train changes. In effect, changes in tire size or other such alterations to the vehicle's drive train require a new speedometer constant to be applied if the speedometer instrument is to maintain the correct speedometer and odometer readings. An advantage of the present invention is a means to functionally supply a mechanical speedometer with a new speedometer constant as needed, not by altering the speedometer itself, but by restoring the mathematically correct relationship between the vehicle road speed and the rotation rate of the speedometer input shaft.

The present invention includes a road wheel rotation rate sensor, a speedometer drive motor, and a microprocessor-based controller. Along with the road wheel rotation rate sensor (hence forth referred to simply as the "road wheel sensor") and speedometer drive motor (henceforth referred to simply as the "drive motor"), both of which are operatively attached to the printed circuit board containing the microprocessor, the present invention consists of two separate microprocessor-based measurement systems working in conjunction with one another. These measurement systems are implemented as various parts of a software program contained in the microprocessor.

Referring now to FIG. 1A there is shown a schematic of the wheel train. The first microprocessor-based measurement system, the "wheel routine", measures the rotation rate of a road wheel (50) attached to the vehicle. A single magnet (48) is strategically placed in a convenient location on an interior hub of one of the road wheels or on a vehicle part that rotates at the same rate as the wheel, such as an axle. Any number of equally spaced magnets would suffice for this task; however, the use of a single magnet negates any possible measurement errors caused by non-equal placement of any of the multiple magnets. A Hall effect or magneto-resistive sensor (46), operatively placed such that the magnet passes in close proximity once each revolution, is also fitted. As the magnet (48) passes over the road wheel sensor (46), an electric pulse signal is generated. Basic math can be used to demonstrate that the measurement of the time between any two pulses (the "rotation period") is sufficient information to determine the rotation rate of the wheel; a little more math shows that the added information of the tire circumference also determines the road speed. The road wheel sensor's direct measurement of the wheel rotation period precludes the necessity of factoring in the effects of any of the other drive train elements.

FIG. 1B shows the second microprocessor-based system, the "drive motor routine", which continually measures and controls the rotation speed of the speedometer drive motor (22). Motor (22) is fitted to the speedometer (10) in place of a conventional speedometer cable. In general, once calibrated, the system includes road wheel sensor (46) to measure the rotation period of the road wheel (that is, how long the wheel takes to complete one rotation), measured in microseconds per rotation, as a "one rotation inter-pulse period" or the wheel rotation period "pulse width". A software program is used to scan the wheel lookup table, looking for the closest entry to the measured pulse width. Once found, the program records in temporary memory the location on the wheel lookup table where the closest the entry was found. The program then looks up a second pulse width value found at the corresponding same location on the speedometer lookup table. The corresponding values contained in the speedometer lookup table are generated during calibration of the present invention, as explained below. The controller uses this corresponding value obtained from the speedometer lookup table to control the drive motor rotation rate to precisely that "speedometer constant-dictated" rate in revolutions per minute needed for the speedometer to indicate the correct speed in miles per hour on the instrument face; as explained above, the fact that the odometer constant and the speedometer constant are numerically equal, for any given mechanical speedometer, ensures that the odometer is likewise rendered accurate.

To properly and effectively control the rotation rate of the drive motor (22), the drive motor (22) is operatively fitted with an "encoder" (24), which enables the controller to monitor the rotation rate of the drive motor (22). A preferred embodiment of the invention employs an incremental encoder that allows the controller to measure and adjust the rotation rate of the motor 32 times per each revolution of the motor shaft. Thirty-two times per revolution of the motor shaft, the motor encoder (24) outputs an electrical signal, which signal is operatively connected (26) as an input to the controller via a connector (28). The controller in turn measures the time in microseconds between each signal and uses the measurements to update the rotation rate of the drive motor driving the speedometer input shaft, thereby updating the speedometer display, again 32 times per revolution of the drive motor shaft.

Information about the rotation of the road wheel is fed by a wheel sensor (48) to the controller via another connector (44). Once a wheel speed of 1 mph or greater is determined, based on input from the road wheel sensor, the drive motor is turned on under program control and rotation rate information from the motor encoder (24) is fed to the motor controller routine in the microprocessor, which allows the microprocessor to measure and adjust the drive motor rotation rate 32 times per revolution of the drive motor shaft. The target pulse width needed by the drive motor (22) to accurately drive the speedometer input shaft, as determined from the corresponding locations on the lookup tables can then be achieved. Preferably, this occurs within a time period to preclude any sense of "jitter" with respect to the mechanical pointer on the face of the driven instrument.

With each measured change in wheel rotation rate sent by the road wheel sensor (46), the above process sends the new target pulse width information to the controller, which in turn controls the rotation rate of the drive motor shaft, which in turn drives the speedometer input shaft at the correct rotation rate to ensure that the speedometer and odometer display accurate information. The parameters of the road wheel sensor, the speedometer drive motor, and the number of signal transitions per revolution of the motor shaft, as provided by the encoder, are chosen by design to accommodate wide variations in tire diameter, speedometer top speed, and the speedometer constant.

The motor control method used in the present embodiment incorporates a standard Pulse Width Modulation, or PWM, scheme. As the motor is being measured and adjusted (slowed down or sped up) 32 times for each of its own revolutions, so too, the PWM signal is either increased or decreased one step as appropriate to effect that correction. The direction of each correction is determined by comparing the latest measured inter-pulse period, that has been sent from the motor shaft encoder to the microprocessor, to the target pulse width found on the "Speedometer Lookup Table" at the location on that table determined by the location on the "Wheel Look-up Table" where the present road wheel rotation period ("pulse width") was found. For example, if the wheel routine determines that the vehicle is traveling at a speed of 55 miles per hour, the drive motor routine will adjust the drive motor rotation rate until the motor encoder output pulse width matches the "target" pulse width found at location 55 on the "Speedometer Look-up Table". As the "target" pulse width is achieved, the controller adjusts the motor rotation rate around the point that keeps the target rotation rate of the drive motor (and hence the speedometer reading) accurate and stable.

A drawback to the just-described approach to controlling the drive motor speed is that at slow speeds, the number of rotation rate corrections received by the drive motor per unit time is relatively small. At very slow speeds the motor can actually stall (stop rotating) between encoder signals. If the motor stalls, the microprocessor controller is waiting for the next signal from the drive motor encoder, in order to initiate the next PWM correction; however since the motor has stalled, the controller never receives the signal from the encoder, and the system ceases to function. To address this issue, a timer-based software routine is provided that increments the PWM signal in the absence of a detected encoder signal. This function will hereafter be referred to as the "Back EMF Simulator". The timer function is chosen to be slightly greater than the pulse width required by the drive motor at the lowest possible speed to be displayed by the speedometer. A counter is incremented in the controller at each timer over flow event and cleared each time the microprocessor receives a new signal from the encoder. If the "stall" condition occurs, the timer will increment the PWM signal to the motor until the motor starts again and the controller drive motor routine again begins to function in its normal mode. Although most cable-driven instruments are not designed to work accurately below 5 mph, the present invention is advantageously able to control the rotation rate of the drive motor, and hence the speedometer needle, to road speeds as low as 1 mph in most instances.

Figure 2:
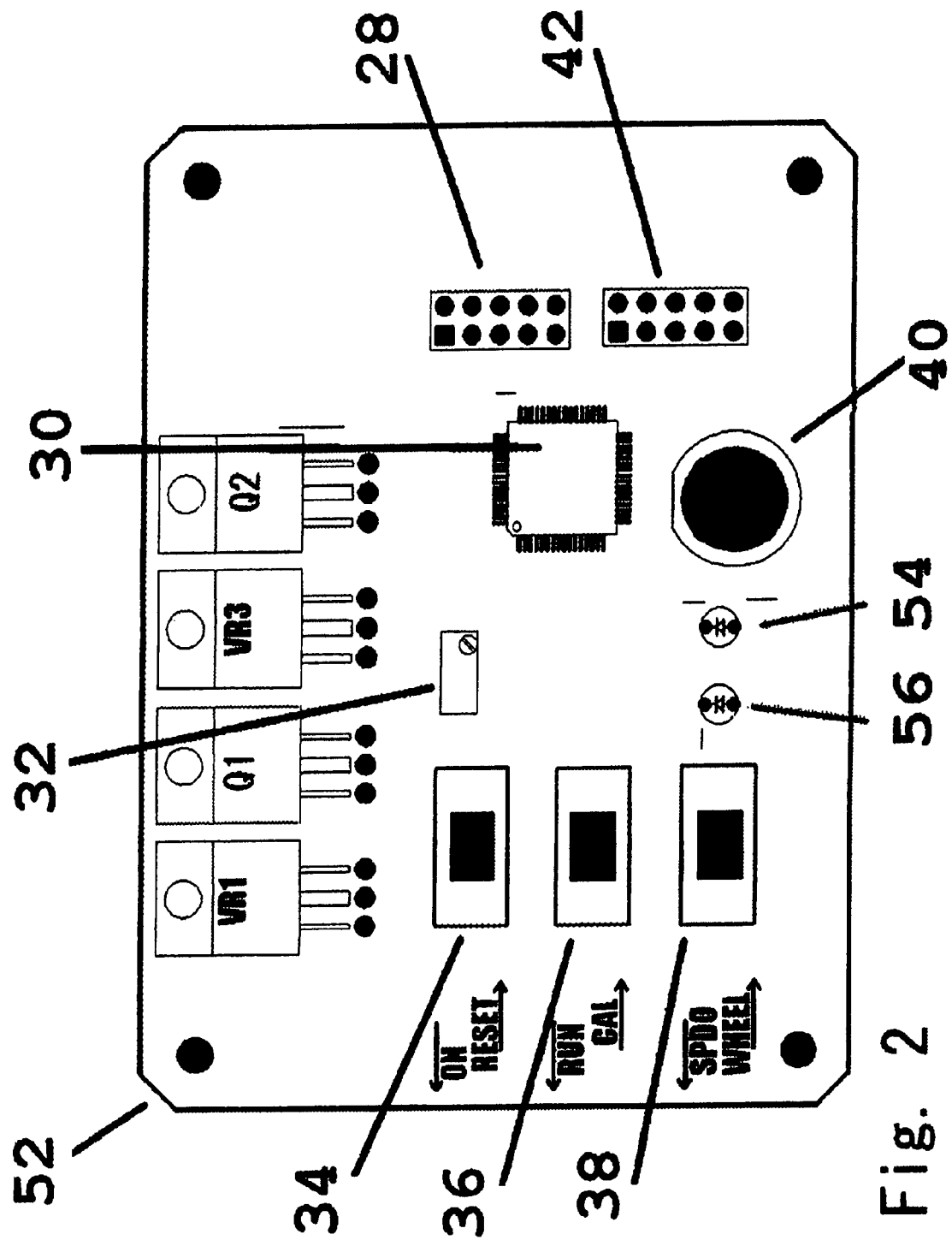
FIG. 2 is a component layout diagram of a controller board according to one embodiment of the present invention.

Referring to FIG. 2 there is shown microprocessor based controller circuit (52). This microprocessor (30) along with various other mechanical and electrical components comprises the controller board. Multi turn trim-pot (32) is used to adjust the voltage output of voltage regulator VR3. VR3 and Q1 produces the source voltage for the drive motor. An ON/RESET switch (34) removes power from the processor providing a mechanical "reset" capability. A RUN/CAL switch (36) directs the program to either the calibration routines or to its normal operating function. When in the calibration mode, a SPDO/WHEEL switch (38) determines which of the two calibration routines is executed. When in either calibration routine, a SET button (40) is used to instruct the program to begin its calculations. Connector (42) is provided to connect the wheel sensor to the controller board. Likewise, connector (28) is provided to connect the motor/shaft encoder assembly to the controller board. Microprocessor (30) contains the control program and choreographs the activity of the system.

Figure 3A:
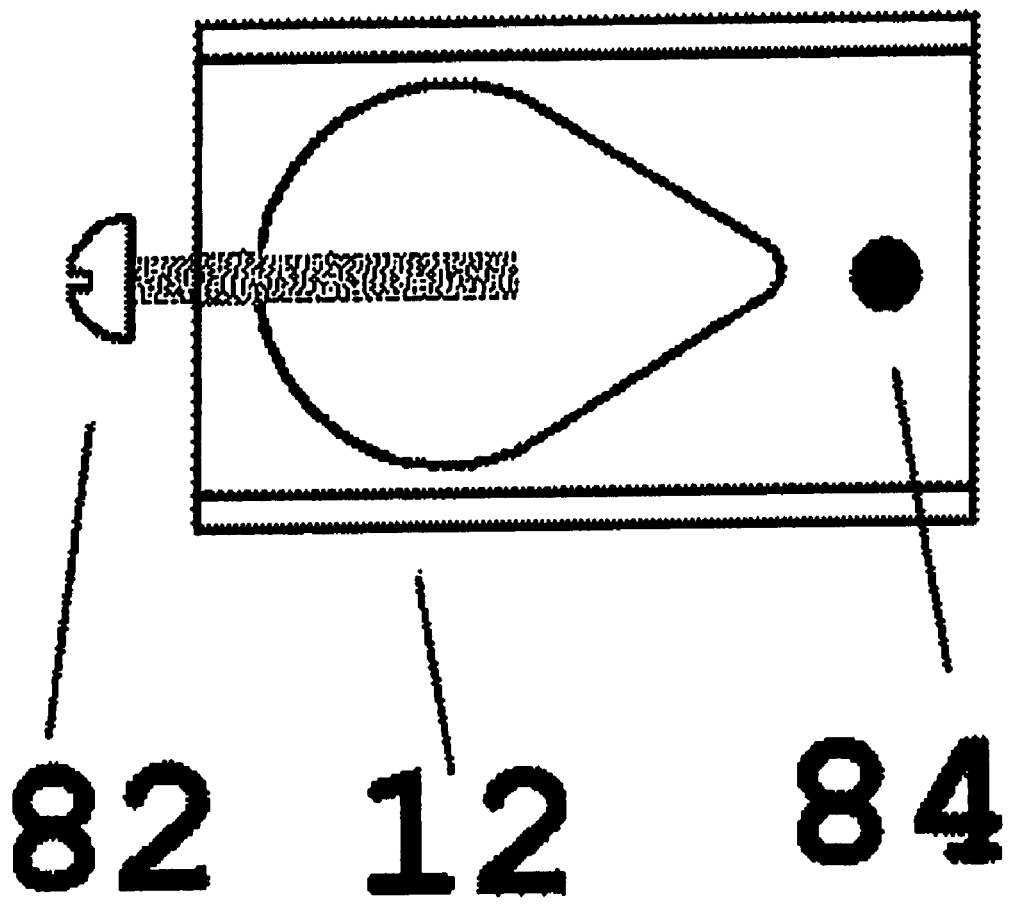
Figure 3B:
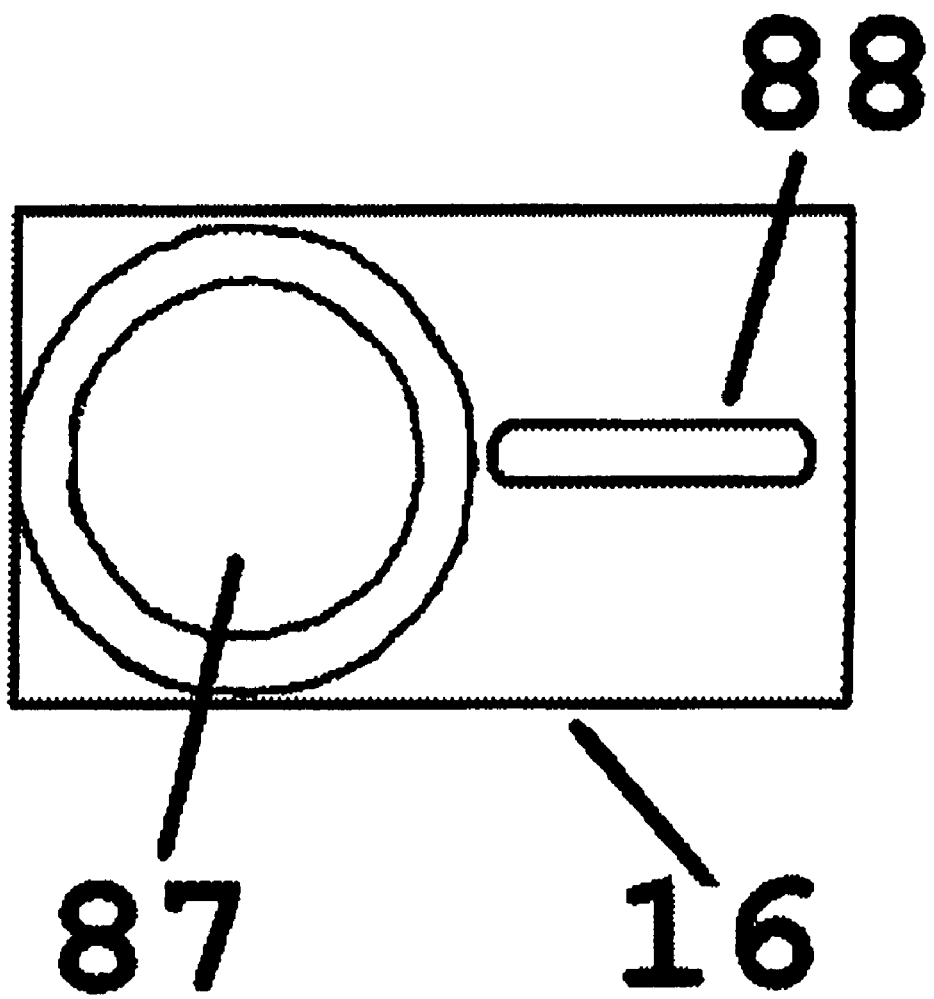

FIGS. 3A, 3B, and 3C show various views of a two-piece mount assembly. Referring to FIG. 3A, the self-aligning mount (12) attaches directly to the part of the speedometer where the mechanical cable once attached. Since this attachment point on the speedometer is cylindrical, the "V" shaped (tapered) hole in the self aligning mount guarantees alignment in at least one axis and will accommodate most, if not all speedometer instruments. The mount is held against the target speedometer by tightening the screw (82) until the speedometer is firmly held against the "V" portion of the mount.

Referring to FIG. 3B, there is shown a top view of the motor carrier (16), where FIG. 3C shows a side view of the same motor carrier (16). The drive motor fits into the hole (87), which, by design is centered along the point of the "V" in mount (12). It can slide along the "V" center axis until the motor directly aligns with the drive input of the speedometer. A pointed dowel, equivalent in diameter to the drive motor can be used to help in the alignment process. Once alignment is achieved, a screw (90) is provided to hold the two parts in place. Screw (90) goes through slot (88) in the motor carrier (16) to allow for adjustment and fastens to threaded hole (84) in the mount. The drive pin (18) is then inserted into the speedometer and finally, the motor (22) is inserted into the carrier (16). Since there is still a possibility that misalignment along other vectors can occur, the loosely coupled forked universal joint/drive pin (18), as shown in FIG. 1B, is included to take up any misalignment that might occur during an installation. A small bar (20) attached to the shaft of the drive motor (22) fits inside the forked portion of the joint (18) and turns the part as the motor turns which, in turn, drives the speedometer instrument. Misalignment of the motor along multiple vectors can now be accommodated. The end portion of the forked drive pin (18) is shaped like the end of the speedometer cable it is replacing. This pin is inserted into the speedometer prior to the attachment of the drive motor.

Figure 4:
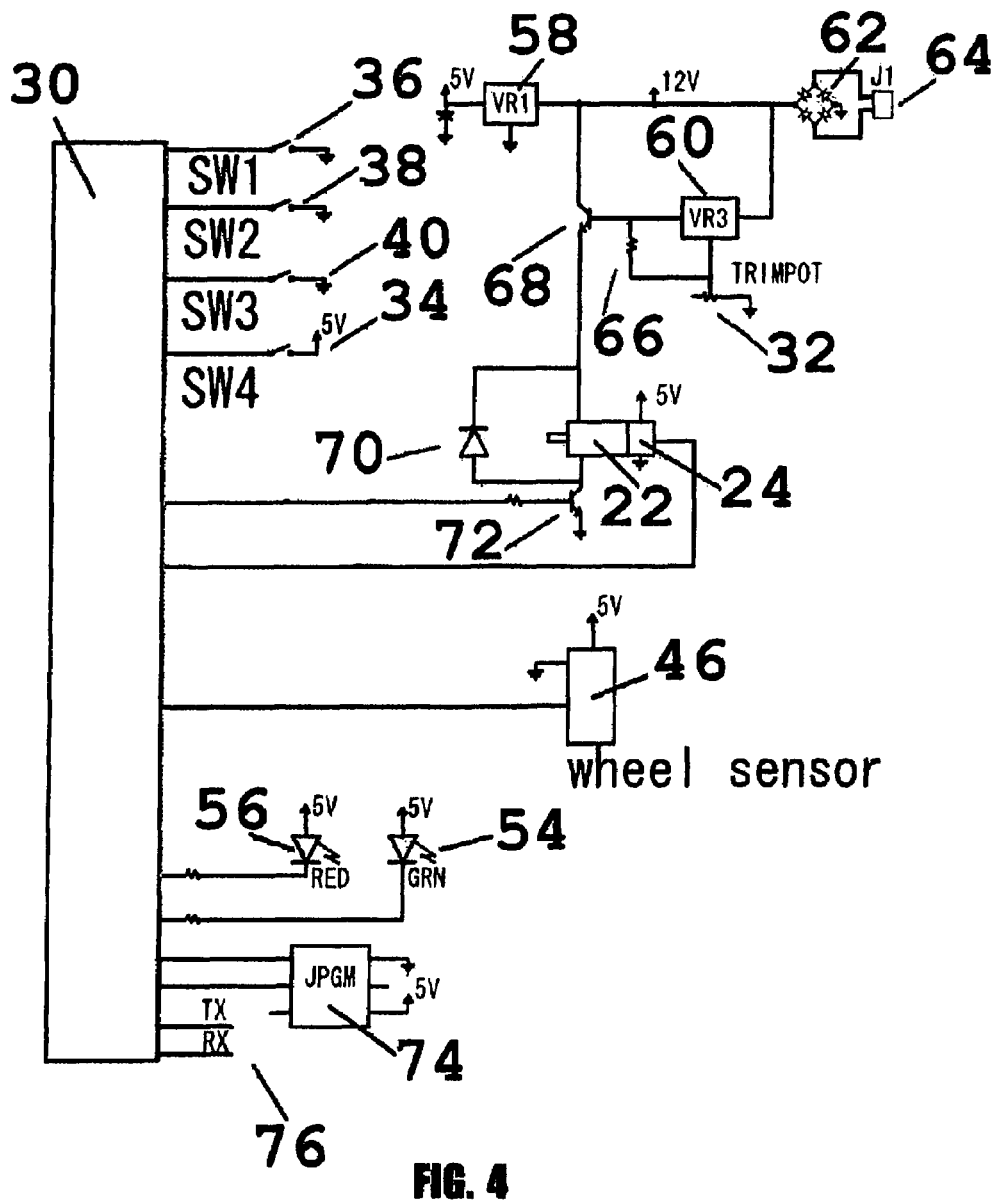
FIG. 4 is schematic drawing of an apparatus according to one embodiment of the present invention.

Referring to FIG. 4, there is shown a schematic drawing of one embodiment of the present invention. J1 (64) is the power supply input to the circuit. J1 is connected to the AC (alternating current) inputs of a diode rectifier bridge arrangement (62). Since the input power supply ground is isolated from the circuit ground by the diode bridge, the power and ground connections to the circuit can be interchanged with no ill effect. This allows vehicles with either positive or negative electrical ground systems to be accommodated. Typically, the voltage applied to J1 is 12 volts DC. VR1 (58) regulates the input voltage to 5 Volts DC (direct current) which is a typical voltage used in present digital circuitry. VR1 can also be a lower voltage regulator to power 1.5 or 3-volt processors. VR3 (60) is an adjustable voltage regulator whose output is capable of being adjusted with the multi turn trim-pot (32) from zero volts to just below its input (approximately 11 volts). The ratio of the values of resister (66) and trimpot (32) determine this output voltage. VR3 feeds the base of transistor Q1(68) which is the variable voltage power source to the speedometer drive motor (22). Transistor (72) provides a path to ground for the motor current. This transistor is turned on and off under program control by microprocessor (30). Protective diode (70) acts to reduce the inductive spikes across the motor on turnoff. Attached to the back of the drive motor is a magnetic type shaft encoder (24).

The output of encoder (24) is one of two principal inputs to the processor. Wheel rotation rate sensor (46) provides the second principal input. In the present embodiment, the wheel sensor is implemented as a magnetic hall effect device operatively placed to detect a magnet attached to a rotating hub or axle passing in front of it. Power and ground is provided by wires between the sensor to the controller board. A third wire is provided to conduct the sensor output signal to the controller board. It is anticipated and understood that wireless methods of communication between the sensor and the processor are also an option. The red and green light emitting diodes (54) and (56) are included as visual indicators of various system operations. Resistors limit the current through each of these devices. Program connector JPGM (74) is required by the processor as a means of entering the desired operating program code. As discussed earlier, it may be useful in some instances to be able to connect this invention to an external computer device or incorporate a numeric keypad input. Many modern processors have built in support for external communication. IIC, Rs232, and USB are, at present, typical. The TX and RX connections (76) to the processor are available to wire to whatever communication protocol connector that might be utilized.

Secondary inputs to the processor include four switches, each of which instructs the program to execute a different function. SW1 (36) is a single pole two-position switch. This is the Calibrate/Run switch that will be further referred to when discussing the program operation. SW2 (38) comes into play when SW1 is placed in the Calibrate position. This is the SPDO/Wheel switch and is also a single pole two-position switch. SW2 directs the program to execute either the speedometer calibration routine or the wheel calibration routine, depending upon its position. SW3 (40), the "SET" button, is a momentary push button switch, which also comes into play during calibration. The function of this switch is to allow the user a way to inform the program that he or she has completed the adjustment of the instrument to their satisfaction. The "set" button instructs the program to begin further processing. SW4 (34) is a single pole two position switch. Sw4 supplies primary power to the processor in one position and effectively acts as a reset to the processor in the other.

Once the component parts of the invention are mechanically connected to the speedometer, calibration of the device is easily accomplished. There are four switches on the control unit (52). Three of these are instrumental in accomplishing the setup and calibration of the device. The first of these switches (36) places the unit in either the "normal run" mode or in the "calibration mode". The second switch (38) determines whether the speedometer lookup table is to be generated, or whether the wheel lookup table is to be generated. The control unit (52) is first placed in the calibration mode by switch (36) on the microprocessor controller circuit board (52). Three steps are necessary to complete the calibration of the device. First, a "Speedometer Lookup Table" is created. Second, a "Wheel Lookup Table" is created. Finally the speedometer is adjusted for maximum deflection, so that the drive motor will never spin the input shaft fast enough to cause the speedometer needle to forcibly contact its upper restraints and possibly incur damage. Calibration is accomplished under program control, with very simple input from the user, and without the need of moving the vehicle. Further, it can be accomplished with the speedometer and the present invention installed or not installed in the vehicle. Further still, it can be done accurately by the vehicle owner without the necessity of taking the vehicle or its speedometer to a repair shop.

Once the drive motor (22) is installed in place of the speedometer cable, the unit can be calibrated and recalibrated (if further changes to the vehicle drive train have been made), whether the speedometer and/or the present invention are currently installed in the vehicle, or one or both are removed from the vehicle.

The controller is first set to calibrate the speedometer instrument itself. This is necessary because the speedometer look-up table that is generated here will be used to create the "wheel look-up table" in the next operation. The program first sets the PWM signal to 100%. Maximum motor speed is ultimately a function of how much voltage is applied to the motor. This is controlled by manually adjusting the maximum available voltage to the motor (while the PWM is set to 100%) using the multi turn potentiometer (32) with either a knob or screwdriver adjustment. The user sets the speedometer so that the instrument needle is visually pointing to 60 miles/hour. The user then presses the "SET" button (40) on the controller board; pressing the "SET" button instructs the program to measure the time period of one complete motor encoder pulse at that particular speed where the button was pressed. This measurement at 60 miles/hour is equivalent to the speedometer constant. Since the time period (pulse width) (and hence the motor's rotation rate) at a known speed (60 mph) has now been determined, and the relationship of one speed to any other given speed is a linear function, relative pulse widths for any other given speed can be mathematically determined.

Given now the 60 mph inter-pulse period value (time), 1 mph can be calculated as 60 times that value. One can now divide the 1 mph time by two, to derive a 2 mph relative time, or by 5 to derive the relative 5 mph time, or by 100 to derive the relative 100 mph time, and so on. At this point in the calibration routine, the calibration program determines the equivalent pulse widths for 1 to 255 miles per hour and writes the result of each speed calculation into a 255-location lookup table in RAM. When the process is complete, the RAM lookup table is copied to non-volatile memory (e.g. Flash, EEprom, NVSram or similar technologies). This process is accomplished in only a few seconds and inherently takes into account the instrument's calibration constant. Accuracy is determined by how close to 60 mph on the instrument face the user sets the needle before pressing the "set" button. The calibration of the odometer is, by default, adjusted as well since its accuracy is a function of the proper rotation rate of the speedometer input drive.

The adjustment for wheel size is the functional equivalent to changing the speedometer cable drive gears and employs very similar concepts. Once the speedometer lookup table is created, it can be used as a tool to calibrate the wheel sensor. The task is to make a new lookup table for the particular tire diameter being used. The principle here is to mathematically determine ahead of time, what speed would be showing on the newly calibrated speedometer if it were going 60 mph on any given size road wheel/tire. Larger diameter tires than originally specified by the vehicle manufacturer will cause the speedometer to read lower than true speed. Smaller diameter tires will cause the speedometer to read higher than true speed.

The difference in wheel diameter (actually its circumference) is now the only factor involved in determining the proper correction factor. If the program includes the time it takes a reference diameter tire to make one revolution at any given speed, the program can also determine the time at that speed for any other diameter tire. Because the length of time it will take any given size tire to make one revolution when the vehicle is going 60 mph is mathematically predetermined precisely by the tire's circumference, one can easily compute the wheel sensor "pulse width" for one rotation of the wheel when the vehicle is going 60 mph, for any given tire size, and compare it with the reference included in the program. The motor encoder lookup table will be used here as a "pointer". As the vehicle is stationary and the wheel itself need not be turning we can substitute the drive motor encoder for the wheel sensor if we can equate a pulse width value on the motor encoder lookup table to the known value of our desired tire size. For any given tire size the user may set the "spdo/wheel" switch to "wheel" and adjust the newly calibrated speedometer with the multi-turn potentiometer (32) to the speed shown on the tire chart next to the tire size being used.

The user adjusts the multi-turn potentiometer on the controller (52) to set the speedometer needle to the indicated speed on the wheel size chart and then pushes the "SET" button (40). Pressing the "SET" button instructs the program to measure the time period of one complete motor encoder pulse at that particular speed, and looks it up on the speedometer lookup table, recording the location where it was found. The program then goes to the same location on the "Reference Wheel Look-up Table" included in the program and reads the pulse width found there. This is the pulse width of the new size tire at 60 mph. The pulse width value is then recorded and assumed to be the value at 60 mph for this new tire size. From this value, pulse width values from 1 to 255 mph are calculated by the program and written first to RAM and then copied to non-volatile memory (FLASH) in the form of a newly generated wheel lookup table.

A user may also set up the system up for maximum deflection. Once the "Wheel Look-up Table" is created, the final task for the user is to adjust the multi-turn potentiometer (32) once again, to allow for maximum deflection of the speedometer needle. This allows speedometers up to 255 mph to be accommodated, while not damaging speedometer instruments that only go to 80 mph, for example.

It should be noted here that when using a "healthy" speedometer, the odometer is also being corrected by default. However, if the magnets or springs of the particular instrument being used are weak or worn or otherwise changed from the way they were when new, the present invention will correct for that inaccuracy and make the instrument speed pointer read correctly once again, since the new calibration constant is derived from the reading taken at the user's visual indication of 60 mph. However, the accuracy of the odometer portion of the instrument may or may not be improved in this circumstance. The same problem arise whenever gear sets are changed in the original cable drive, as is the usual time-consuming and expensive route to regain accuracy when using the speedometer cable drive. Given the present invention's ability to determine its own motor speed and control the motor accordingly, a secondary and useful function is also implemented in the program.

As discussed above, the odometer accuracy is a function of the rotational rate of the input and can be checked by rotating the input the exact number of turns as indicated by the factory specified speedometer constant. For example, one of the speedometer instruments used while developing this device has a constant of 1026 revolutions per mile. If the program makes the motor turn 1026 times and then stops, the odometer will increment exactly 1 mile from where it started. If the motor is turned at 1026 revolutions per minute, the speedometer should indicate exactly 1 mile/minute or 60 miles/hour. Any deviation from this 60 mph speed indicates an inaccuracy in the speedometer gauge itself and further indicates that repairs to the instrument need to be made.

This function is similar to performing a "measured mile" test where, traditionally, the operator drives at an indicated 60 mph between two highway mileposts and then checks the odometer to see whether or not 1 mile was actually traversed—a procedure that at best has minimal accuracy. With the present invention, however, accuracy is assured since the input to the instrument is precise and all other necessary factors that could contribute to an ambiguous measurement are simply not present. Additionally the added safety factor of being able to conduct this test without having to be on a public road or divert one's attention from the task of driving the vehicle is of considerable benefit. This "Measured Mile" test can be conducted in one of two ways: If the factory specified number of "revolutions per mile" is to be used as the reference, some form of user input needs to be included, since the factory-specified speedometer constant number needs to somehow be input into the program. An interface to a desktop computer, laptop computer, palm computer, or dedicated keypad type device could be included on the controller board. Rs232, USB, IIC, optical, wireless or any of the myriads of input technology can be utilized for this purpose. However, from the point of view of the end user, a computer or keypad input device adds cost and complexity of use. Conversely, and in addition, if and when the speedometer constant is determined as previously described by taking a visual reading of 60 mph on the instrument face, (as done during the "Speedometer Calibration Routine") a program function is included which spins the motor at that exact speed for exactly one minute and then turn the motor off. This is another measured mile test and is the preferred method of conducting it.

At the end of the one-minute test, the odometer should indicate an exact 1-mile change. Any deviation will indicate whether the chosen 60 mph setting is too high or too low. Since the factory designed constant is "deduced" rather than "directly input", an odometer change of more or less than one mile could be the result of either the user pushing the "SET" button at some speed other than 60 mph or it could be the result of a faulty instrument. If several tests are conducted and the operator is reasonably certain that the correct setting was made, it can be safely assumed that the speedometer instrument itself needs professional attention. Once again it should be noted that the present invention can and will compensate for inaccuracies in the SPEEDOMETER. Mechanical speedometers contain a balanced set of springs and magnets. Since the user sets "60 mph" by visually confirming that that is where the speedometer needle is pointing, (and thereby determines the rotation rate of the speedometer instrument input and hence the effective speedometer constant), any combination of errors introduced by a fault in either the spring or magnet is, by definition, accounted for. If the speedometer itself is "healthy", then the present invention will also automatically cause the ODOMETER to again read accurately. However, if the speedometer is internally worn, or the aforementioned magnets and spring are no longer functioning to within their original specifications, then the factory set speedometer constant is no longer accurate for that speedometer, however it is accurate for the odometer (as described above, the same input drives two separate internal measuring devices—the speedometer and the odometer—in a speedometer instrument; either can malfunction independently of the other).

The present invention can, as stated above, within limits, compensate for and restore accuracy to the speedometer but not necessarily to the odometer that works in conjunction with it. Along with the springs and magnets internal to the mechanical speedometer, wheel size changes will also contribute to road speed indication inaccuracies. Because the inter-play between any combination of these error sources is unpredictable, the accuracy of the odometer may or may not be improved. By conducting the "Measured Mile" test discussed above, the speedometer's accuracy can be easily and safely evaluated. If it is found to be off by a measurable amount, this is an indication that the speedometer itself should be repaired or replaced. It should be noted that the owner would have the same problem with the traditional cable drive and gear sets, but would be without an easy means to ascertain the source of the inaccuracies.

The above setup and adjustment scheme allows for an easy installation and setup without the need of any special knowledge or equipment. Using the instrument face itself as an input component allows for a very economical construction since user input in the form of a keypad or computer is not necessarily needed. It is expressly understood that the calculations necessary for determining wheel speed and motor speed can be made using a microprocessor with floating point calculating capability to perform these calculations in lieu of using lookup tables, and that various information can be sent to the device from external sources. In either case, the correlation between a wheel rotation speed and the speedometer drive rotation speed must be established and maintained until a new speed is detected.

The present invention includes an embodiment utilizing a low voltage direct current motor and look-up tables. Alternative types of motors or wheel rotation rate sensing devices could suffice for use in conjunction with the present invention. Stepping motors, for example, are inherently more accurate and might replace the dc motor by controlling the repetition rate of the pulses being fed to it in response to the wheel sensor vehicle speed data. However, the present state of stepper motor technology is such that the top speed of economically priced, (if not all) steppers is too low to be of universal use. Gearing the stepper to allow for higher output shaft speed is possible but with a commensurate drop in torque that would require a higher power, and therefore a larger and more expensive motor. Other types of motors also have their inherent benefits and drawbacks. As weight is a factor important to many auto enthusiasts, one goal of the invention is to keep things small and light in weight. At the present time a DC motor provides the most cost-effective solution and hence is described herein. It should also be noted that the embodiment described uses a 12-volt system with either a positive or negative ground system. In some embodiments adjustments to the basic schematic, various voltages and grounding schemes can be accommodated.

Figure 5:
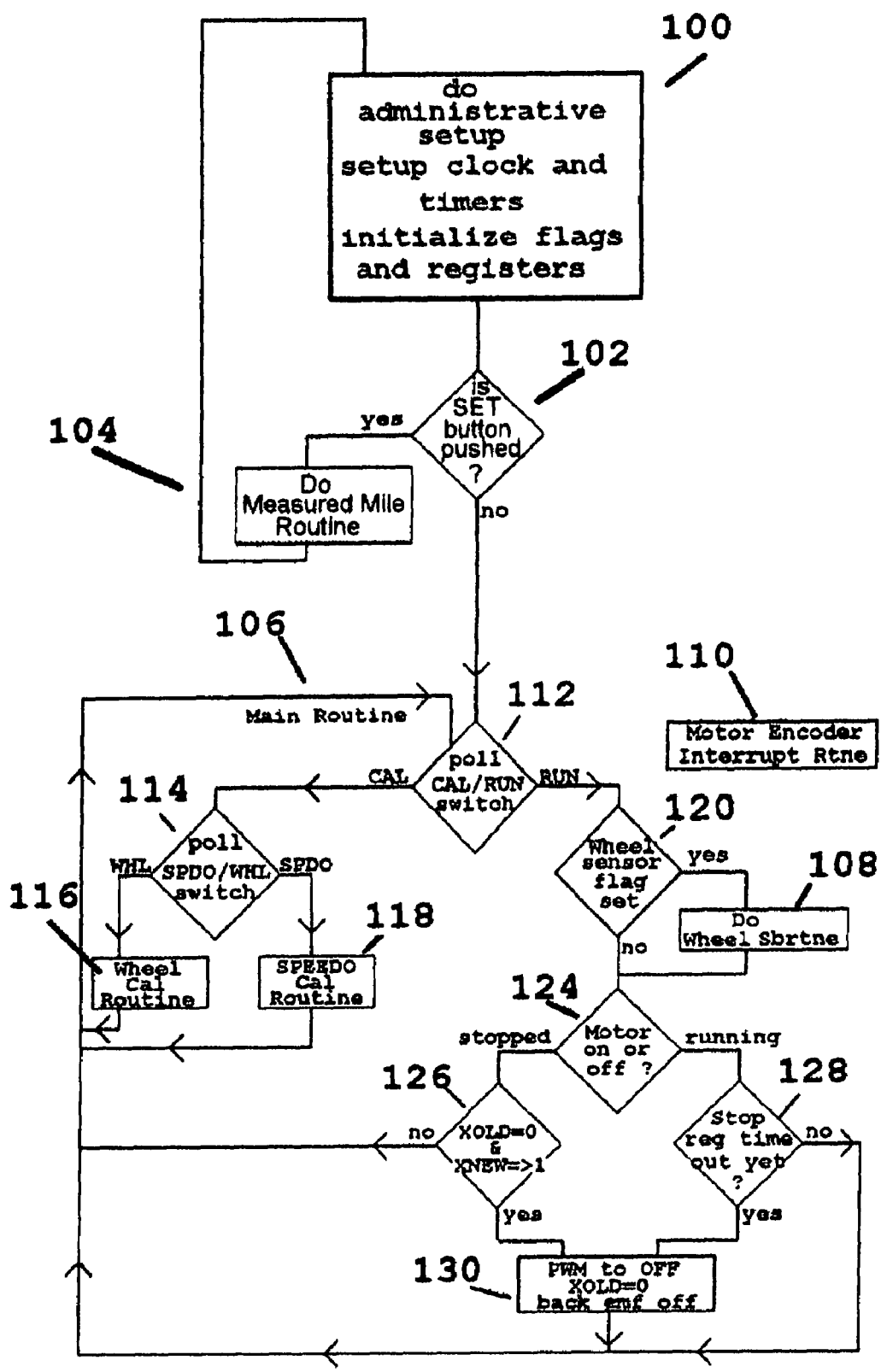
FIG. 5 is logical flow diagram of a program routine according to one embodiment of the present invention.

In some embodiments of the present invention a software program resides in FLASH memory internal to the microcontroller. In order to be more easily understood, FIG. 5 shows a functional flowchart of the program. The program consists of five functional sections. The initial starting code (100) is not considered here as one of the five sections, but is administrative in nature and handles tasks such as setting the clock speed, initializing timers, registers and various flags and setting the parameters for the timer PWM function needed by the various five routines. The five functional program sections are: Main Routine (106), Wheel Speed Subroutine (108), Motor Encoder Interrupt Routine (110), Speedometer Calibration Routine (118), and Wheel Calibration Routine (116). In support of the five primary routines are several small interrupt and subroutines whose function can be considered as further divisions of one or more of the five primary program sections and will be referred to when discussing that section.

Still, referring to FIG. 5, the main routine can be seen to be a loop, with each of the other sections being exercised as either a subroutine or an interrupt routine dictated by the sensors and switches. Upon starting, before entering the main routine, the program polls the "SET" button (102). If this button is depressed at this time, the program executes a "Measured Mile" test (104) discussed earlier. Upon exiting the test, the program restarts from the beginning. Upon entering the main routine, the program first polls the Cal/Run switch (112). If the switch is in the "Cal" mode, the "Speed/Wheel" switch is polled (114). If the Speed setting is found, the program executes the Speedometer Calibration routine (118). If the Wheel setting is found, the program executes the Wheel Calibration routine (114). Upon exiting either routine, the program loops to the beginning of the main routine (112). If the "Cal/Run" switch is in the "Run" mode, a flag is polled (120) which determines if the wheel sensor has interrupted the process since the last time the flag was polled. The wheel sensor interrupt routine simply sets the flag and returns to the main routine. If the flag was set, the Wheel subroutine (108) is entered whose purpose is to determine the present road speed. When the wheel speed routine is entered, the associated interrupt flag is cleared. In this way, the wheel speed routine is given a lower priority and its access can be more selectively controlled. If the flag is not set, the program determines if the motor is presently stopped or running (124). If running, criteria are checked to see if the motor needs to be stopped (128). If it does, the power to the motor (PWM Signal) is turned off and the back EMF simulator is disabled (130). If stopped, criteria are checked to see if the motor should be started (126). If it does, the power to the motor (PWM Signal) is enabled and the back EMF simulator is also enabled to prevent stalling at low speeds.

Figure 6:
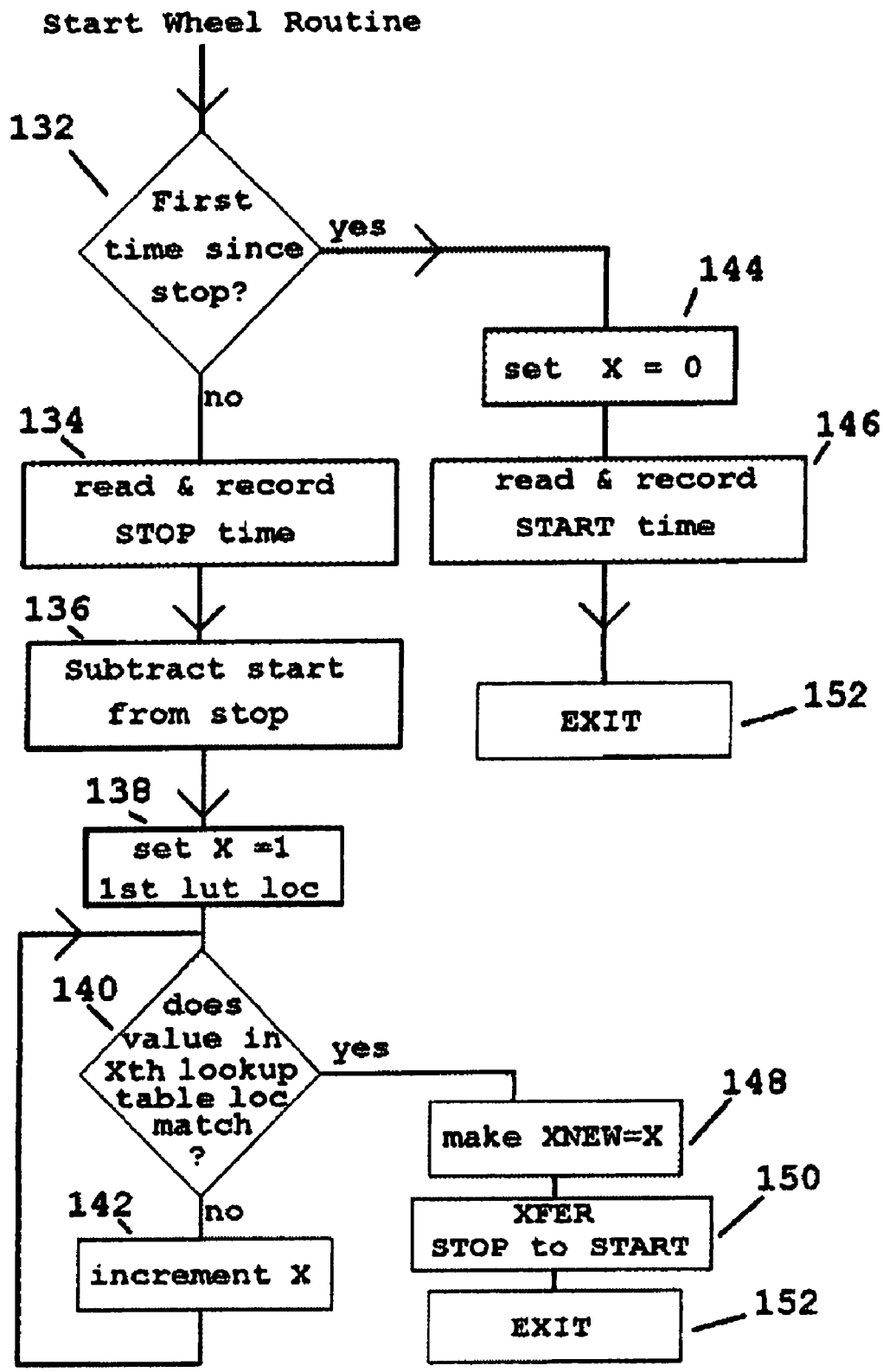
FIG. 6 is logical flow diagram of a start wheel program routine according to one embodiment of the present invention.

Referring to FIG. 6, there is shown a wheel speed sensing routine. A "New Wheel Speed Ready" flag gets set in a separate interrupt routine which happens each time the magnet attached to a rotating part of the drive wheel passes in front of the hall effect wheel sensor. The main program calls the wheel routine when the associated flag is polled and found to be in a "SET" condition. When the "Wheel" routine is entered, the associated flag is cleared. Provision is made in the program to determine if this is the first time the wheel program was entered after the vehicle was at zero mph, that is, stopped (132). The first time through the routine requires the timer values to be recorded and stored for later use (146) after setting the values X to zero first (144). The routine is then exited (152).

On subsequent entries into the routine, the present timer value is recorded (134) and the previously recorded value is subtracted from it (136) in order to determine an elapsed time for one wheel revolution. The system timer is selected to give this value in real time measured in microseconds. The program then sets value X to equal 1 (138). Value X is a position pointer for a look up table. Value X determines where on the look up table the next byte of data is to be found. The program iteratively checks (142) this elapsed time value against each entry in the wheel look-up table created during the wheel calibration routine (140). As this look-up table contains elapsed time values for the specific tire size being used and is organized sequentially from 1 mph to 255 mph, the location on the look-up table which most closely matches the present elapsed time is the road speed of the vehicle for this particular rotation of the wheel. The position on the lookup table where the closest match is found is represented by the value of "X". Thus X is the road speed of the vehicle for this rotation. This value is recorded in a dedicated memory register referred to as "XNEW" (148). Once XNEW is determined, The "NEW TIME" value read at the beginning of the routine is transferred to the "OLD TIME" register to provide a reference for the next rotation of the wheel (150). In a similar fashion, the previous XNEW value is transferred to the XOLD registers in order to determine acceleration, deceleration, and vehicle start or stop conditions. The program then exits (152).

Figure 7:
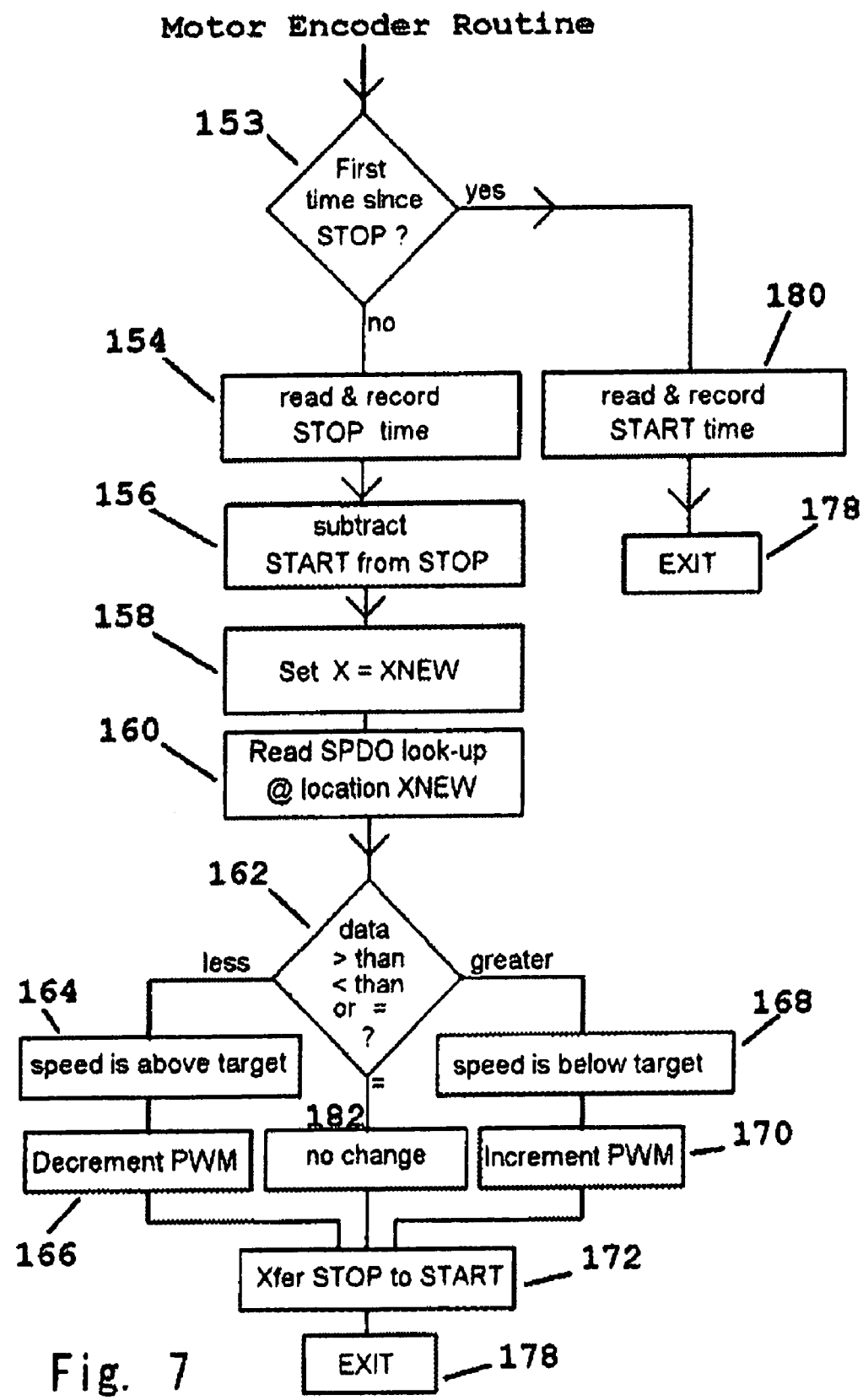
FIG. 7 is logical flow diagram of a motor encoder program routine according to one embodiment of the present invention.

Referring to FIG. 7 there is shown a motor encoder routine. Provision is made in the program to determine if this is the first time the motor encoder program was entered after the vehicle was at zero mph, that is, stopped (153). The first time through the routine requires the timer values to be recorded and stored for later use (180). The routine is then exited (178).

When the wheel routine indicates a speed change from zero (0) to one (1) mph, the main routine executes the "MOTOR ON" routine which initializes the PWM signal to a relatively small percentage of its maximum. The back EMF simulator is also activated. The motor should be running slowly at this point, but may or may not be running at all due to the mechanical load presented to it. The SPDO interrupt routine is entered each time the shaft encoder on the motor moves 1/32 of a turn (in this particular embodiment). As it is an interrupt situation, the routine will not be entered unless the motor begins to turn. In the likely event that it may not, a timer is provided which increments the PWM signal, one step at a time until the motor begins to move, at which time the Back EMF Simulator is disabled until the motor once again stalls.

As the motor turns, the interrupt time is recorded (154) and the previous time is subtracted to get an elapsed time (also in microseconds) (156). This elapsed time value is compared to the value stored at the "XNEW" (158) (table location of road speed value found in the last execution of the wheel routine) location on the speedometer look-up table created during the SPDO Calibration routine (160). This is the target speed the program will attempt to achieve. As this is a time measurement, larger time values represent slower speeds and vice-versa.

The program then determines the value of target speed (162). If the present measured value is found to be larger than the XNEW value on the lookup table (168), it follows that the speed is too slow and the PWM is incremented by one step (170). Conversely if the measured value is found to be smaller than the XNEW value on the lookup table (164), the PWM is decremented by one step (166). If they are found to be equal, no correction is made (182). As these corrections are made at each encoder transition, the motor will be adjusted 32 times per revolution and will attain it's target speed well before the mechanical time constants of all or most speedometer instruments (172), eliminating any visual instrument pointer lag due to slow computer processing. The program then exits (178).

Figure 8:
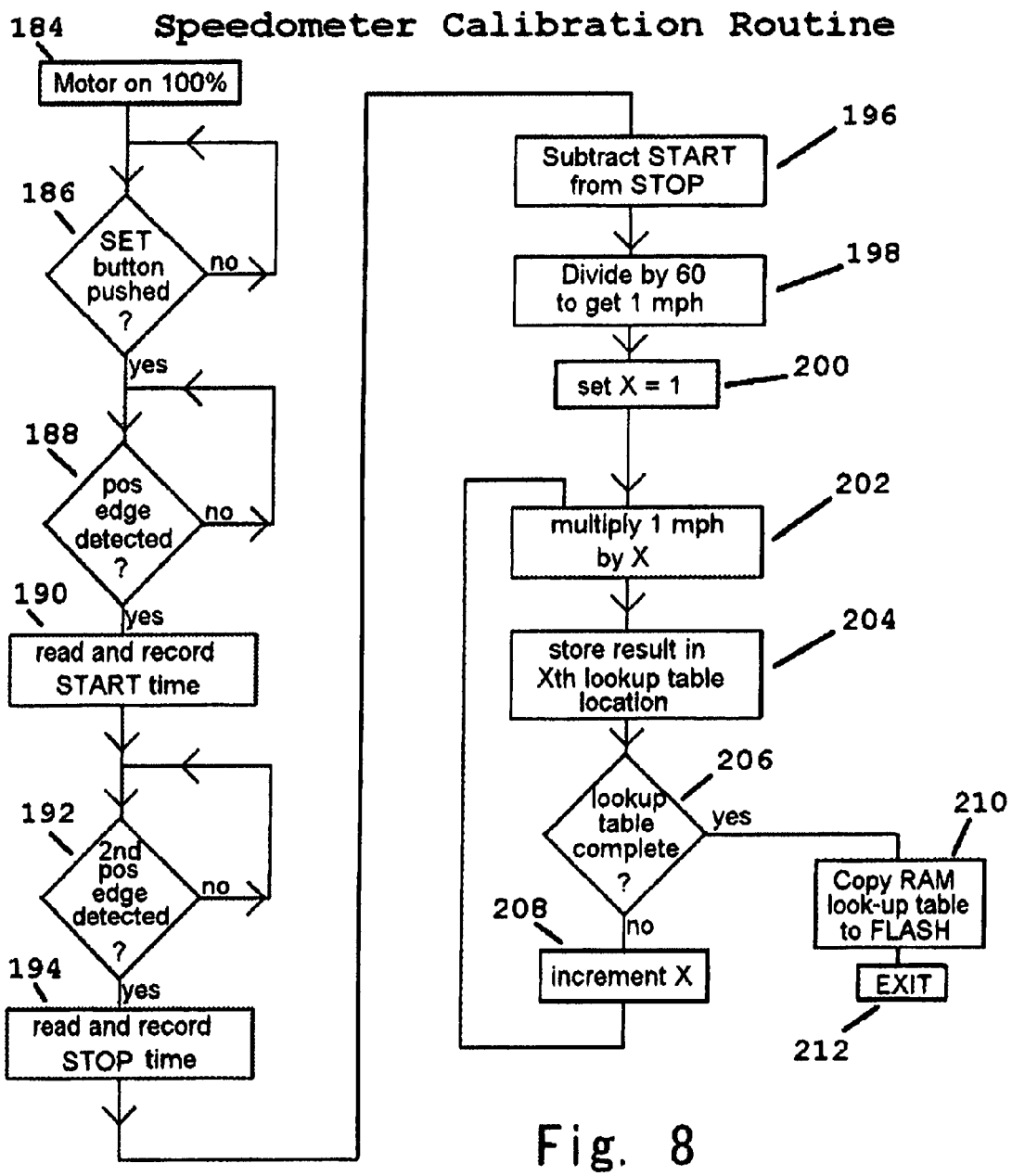
FIG. 8 is logical flow diagram of a speedometer calibration program routine according to one embodiment of the present invention.

Referring to FIG. 8 there is shown a speedometer calibration routine. The first of two required steps in preparing this device to be used with any given motor vehicle is to adjust the device for the particular speedometer instrument being used. As previously mentioned, mechanical speedometers are not all built the same. For each instrument, a particular number of revolutions of the input are required to realize one mile. This number is the speedometer constant in revolutions/mile. This number varies greatly between various makes and models of speedometer instruments. In some cases this number is disclosed somewhere on the instrument; quite often it is not.

Since the shaft rotation rate of the motor now driving the instrument is monitored, measuring the motor shaft rotation rate at 60 mph produces a number that can effectively be used as the speedometer constant by the program.

When the run/cal switch is in CAL and the spdo/wheel switch is set to spdo, the program enters the Speedometer calibration routine. Setting the PWM signal to 100% first turns on the motor (184). The user adjusts the multi turn trim-pot to affect a visual reading of 60 mph and presses the "SET" button (186). The multi turn trim-pot does not affect the PWM signal but rather changes the supply voltage to the motor to attain the desired speed. The program detects a positive encoder signal (188), reads and records the time (190) and then detects a second encoder signal (192). In all the program detects one complete motor encoder pulse period (194), to derive an elapsed time (in microseconds) for $\frac{1}{32}$ revolution of the drive shaft at 60 mph for this particular speedometer instrument (196). The program then divides this elapsed time by 60 to get the elapsed time for $\frac{1}{32}$ revolution of the drive motor at 1 mph (198). This number is recorded in the first location of the speedometer lookup table. This 1 mph value is then multiplied by value X (202), which is initially set to 1, (200), then to two to get the 2 mph value, then by three to get the 3 mph value and so on until the highest speed on the lookup table is calculated and recorded (204). In some embodiments, the lookup table is first calculated and written to RAM.

This sub-process continues by incrementing X up one numeral until the look-up table is complete (208). When complete (206), the contents of the RAM look-up table are transferred to non-volatile FLASH memory, automatically under program control (210). When the flash look-up table is complete, the motor is turned back on and the program returns to the beginning of the speedometer cal routine awaiting either another calibration attempt or a change in the run/cal, or speed/wheel switches. The program then exits (212)

Figure 9:
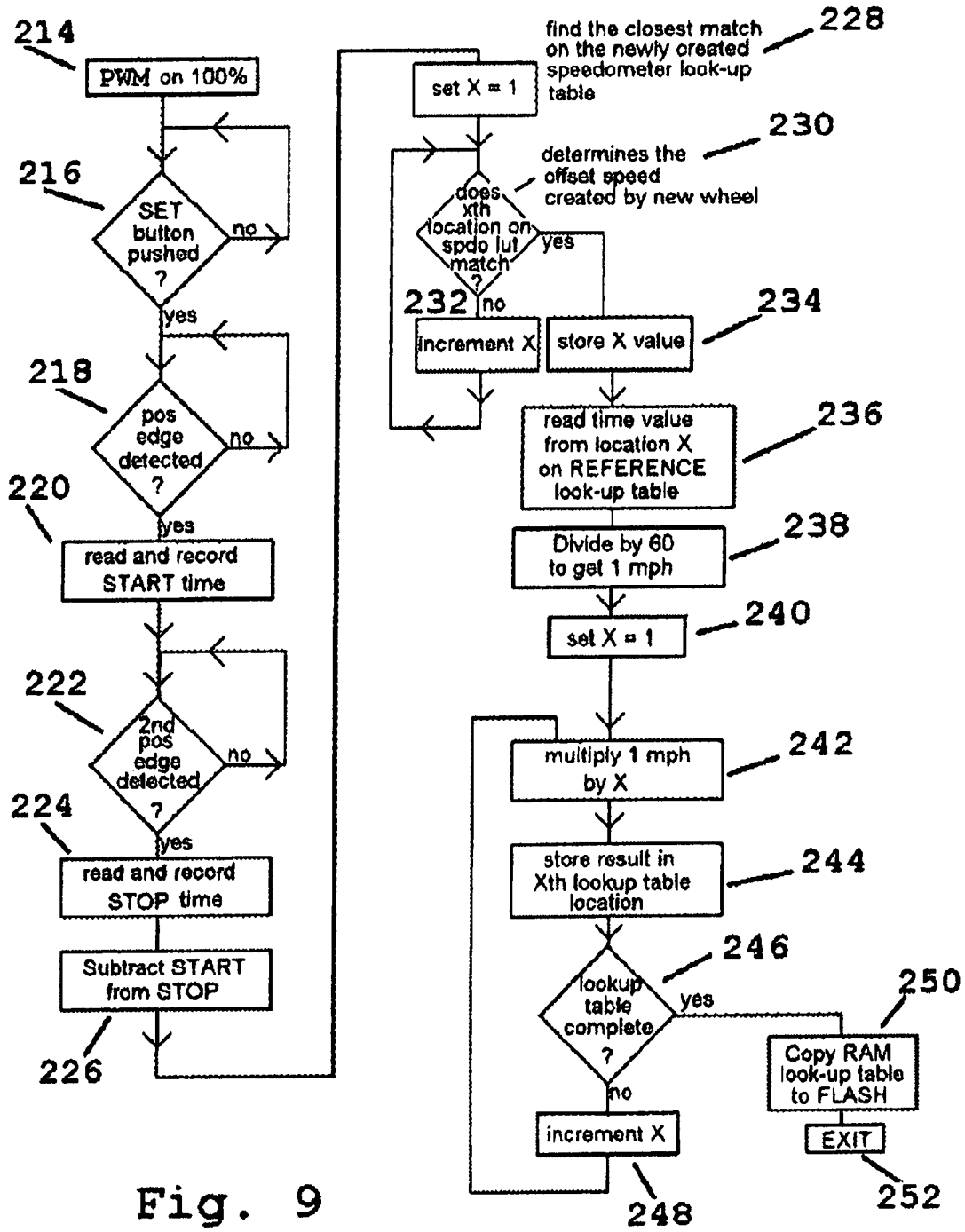
FIG. 9 is logical flow diagram of a wheel calibration routine according to one embodiment of the present invention.

Referring to FIG. 9 there is shown a wheel calibration routine. The second of the two required steps in preparing this device to be used with a given motor vehicle is to adjust the device for the specific diameter tire being used. The SPEED/WHEEL switch is next set to WHEEL. The program begins execution of the wheel calibration routine. Setting the PWM signal to 100% turns on the motor (214). The multi turn trim-pot is then adjusted to produce the visual pointer speed indicated next to the correct tire diameter according to a tire diameter chart. When the setting is deemed to be correct, the user presses the "SET" button (216). A first positive encoder pulse edge signal is detected (218) and the time is read and recorded (220). A second positive encoder pulse edge signal is detected (222) and the time is read and recorded again (224). The first and second positive encoder pulse edge signals are subtracted from one another to produce an elapsed time of $\frac{1}{32}$ revolution (226). This elapsed time is then iteratively compared to each value on the newly created SPEEDOMETER CALIBRATION look-up table, starting from one mph until the closest match is found (228).

The routine determines whether the location of the pointer on the speedometer (232) with that of offset speed created by the new wheel (230). The LOCATION (X) of the value that matches is the offset created by the new wheel size and is then stored (234). The pulse width data found on the REFERENCE look-up table at the offset value X location is the 60 mph value for that particular size tire (236). The program divides this value by 60 to get the elapsed time for 1 mph (238) and records the time in the first location of the Wheel calibration look-up table (240). Again, the 1 mph value is successively multiplied (242) by the desired mph value to determine the value for each speed (244). Once it is determined that the look-up table is complete (246), these values are first written to RAM and transferred to FLASH memory (250). If the look-up table is not completed then the routine increments X up another value (248) and returns to step 242 to complete the process, eventually exiting at 252. The PWM is turned back on and the program returns to the beginning of the routine awaiting another calibration attempt or a change in switch settings.

It should be clear from the foregoing descriptions that many variations on the theme are possible and feasible. This application seeks to describe one simple form of the invention for the sake of clarity. It should be understood that variations on the implementation of the system described could be made without departing from the spirit and scope of the invention. The invention may be modified or varied in many ways and such modifications and variations as would be obvious to one of skill in the art are within the scope and spirit of the invention and are included within the scope of the following claims.

What is claimed is:

1. A speed determining apparatus for a vehicle having a set of road wheels and a mechanical speedometer, the apparatus comprising:
   a motor mounted to the mechanical speedometer;
   a shaft encoder operatively fitted to the motor to facilitate the measurement of rotation by the motor;
   a sensor capable of sensing rotation of one of the road wheels;
   an electronic control circuit electronically connected to the shaft encoder and the sensor, where the electronic control circuit is capable of:
   monitoring the sensor and determining road wheel speed;
   monitoring the shaft encoder and controlling the speed of the motor in response to the determined wheel speed;
   displaying visual indicia based upon a location of a mechanical pointer on the face of the speedometer instrument combined with the measured rotation of the motor by the shaft encoder; and
   where the shaft encoder receives a first positive encoder pulse edge signal and a second positive encoder pulse edge signal from the electronic control circuit to determine an elapsed time of about $\frac{1}{32}$ revolutions of the motor.

2. The apparatus according to claim 1 where the motor is mounted to the speedometer via a self aligning mechanical mount.

3. The apparatus according to claim 1 further comprising at least one memory device.

4. The apparatus according to claim 3, further comprising a first software program stored on the memory device, where the first software program includes instructions to perform road wheel calibration routine.

5. The apparatus according to claim 4 further comprising a second software program stored on the memory device, where the second software program includes instructions to perform motor encoder routine.

6. The apparatus according to claim 5 further comprising a third software program stored on the memory device, where the third software program includes instructions to perform a speedometer calibration routine.

7. The apparatus according to claim 4 further comprising a fourth software program stored on the memory device, where the fourth software program includes instructions to perform a measured mile routine.

8. A method for calibrating a speedometer instrument having a shaft encoder, the method comprising the steps of:
   determining a calibration constant of the speedometer instrument by initiating a set program for the speedometer instrument;
   determining an elapsed time of about 1 complete shaft encoder pulse at a known speed indicated by the speedometer's pointer; and storing the elapsed time at the known speed in a digital storage medium; and iteratively comparing the elapsed time to values on a calibration table until a matched speed is found;

adjusting the location of a pointer on the speedometer by adjusting the motor speed;

determining an elapsed time of about 1 complete shaft encoder pulse at the new motor speed;

comparing the location of the pointer relative to the matched speed in the digital storage medium;

comparing the location of the pointer with that of the matched speed and recording data regarding pointer and matched speed locations.

9. The method according to claim 8 where determining the elapsed time of 1 complete shaft encoder pulse comprises the steps of:

receiving a first positive encoder pulse edge signal;

receiving a second positive encoder pulse edge signal; and determining an elapsed time of about $1/32$ revolutions based upon the first and second positive encoder pulse edge signals.

10. The method according to claim 8 further comprising the step of determining the physical location of the pointer on a mechanical speedometer.

11. The method according to claim 8 further comprising the step of receiving a signal from an electronic speedometer representing the location of the pointer on the electronic speedometer.

12. A method for calibrating a speedometer instrument having a shaft encoder, the method comprising the steps of:

determining a calibration constant of the speedometer instrument by initiating a set program for the speedometer instrument;

determining an elapsed time of about 1 complete shaft encoder pulse, where determining the elapsed time of 1 complete shaft encoder pulse comprising comprises the steps of:

receiving a first positive encoder pulse edge signal;

receiving a second positive encoder pulse edge signal; and determining an elapsed time of about $1/32$ revolutions based upon the first and second positive encoder signals; and storing the elapsed time in a digital storage medium;

iteratively comparing the elapsed time to values on a calibration table until a matched speed is found;

determining the location of a pointer on the speedometer;

comparing the location of the point pointer relative to the matched speed in the digital recording storage medium;

comparing the location of the pointer with that of the matched speed and recording data regarding pointer and matched speed locations.

* * * * *